(12) United States Patent  
Azim et al.

(10) Patent No.: US 9,178,988 B2  
(45) Date of Patent: Nov. 3, 2015

(54) UNIFIED CALL LOGS

(71) Applicant: Verizon Patent and Licensing Inc., Arlington, VA (US)

(72) Inventors: Rezwanul Azim, Arlington, MA (US); Rafael A. Gaviria, Medford, MA (US); Gowtham Javaregowda, Waltham, MA (US); James J. Ni, Westford, MA (US); Robert A. Sartini, Colorado Springs, CO (US); Paul T. Schultz, Colorado Springs, CO (US); Wenbo Su, Newton, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/170,135

(22) Filed: Jan. 31, 2014

(65) Prior Publication Data

US 2015/0222744 A1  Aug. 6, 2015

(51) Int. Cl.
| | |
|---|---|
| *H04M 1/56* | (2006.01) |
| *H04M 15/06* | (2006.01) |
| *H04M 3/42* | (2006.01) |
| *H04M 3/22* | (2006.01) |

(52) U.S. Cl.
CPC .................................. *H04M 3/2218* (2013.01)

(58) Field of Classification Search
CPC ............ H04M 3/436; H04M 3/42263; H04M 1/2535; H04M 3/42017
USPC .......................... 379/156, 164, 142.12, 211.04
See application file for complete search history.

(56) References Cited

U.S. PATENT DOCUMENTS

| | | | | |
|---|---|---|---|---|
| 6,134,308 | A * | 10/2000 | Fallon et al. | 379/142.06 |
| 6,885,739 | B2 * | 4/2005 | Cannon et al. | 379/142.01 |
| 2011/0261942 | A1 * | 10/2011 | Gravino et al. | 379/201.01 |
| 2013/0163738 | A1 * | 6/2013 | Jano | 379/201.02 |

* cited by examiner

*Primary Examiner* — Quoc D Tran

(57) ABSTRACT

A user device may identify a received a signal indicating an incoming call; determine that another user device has answered the call; generate call log information that indicates that the other user device has answered the call; and store or output the generated call log information. Additionally, or alternatively, a set of user devices may receive a ring signal indicating an incoming call; a particular user device, in the set of user devices, may answer the call; and another user device, in the set of user devices, may store a unified call log. The unified call log may indicate that the particular user device answered the call, and may further indicate that the other user device did not miss the call.

20 Claims, 15 Drawing Sheets

400-1 ⟶

| User ID: John@foo.com ||
| Device ID | Device nickname |
|---|---|
| 1.2.3.4 | John's smart phone |
| 1.2.3.5 | John's tablet |
| 1.2.3.6 | John's landline (bedroom) |
| 1.2.3.7 | John's landline (kitchen) |
| 1.2.3.8 | John's laptop |

●
●
●

400-N ⟶

| User ID: Jim@foo.com ||
| Device ID | Device nickname |
|---|---|
| 4.3.2.1 | Jim's office |
| 5.4.3.2 | Jim's personal cell |
| 6.5.4.3 | Jim's work cell |
| 7.6.5.4 | Jim's desktop |

FIG. 4

UNIFIED CALL LOGS

BACKGROUND

Users often own multiple devices that are capable of sending and receiving telephone calls (e.g., voice over Internet protocol ("VoIP") calls). For example, a particular user may own a smart phone, a wired phone, a tablet computer, a laptop computer, and a desktop computer, all of which may be capable of receiving VoIP calls. Some telephony service providers provide a "blast," or "call blast," feature, which may cause multiple devices, associated with a particular user, to ring when a call is placed to the user.

BRIEF DESCRIPTION OF THE DRAWINGS

FIG. 4 illustrates example an example data structure that may be used to store information regarding a set of devices associated with a user, according to some implementations;

DETAILED DESCRIPTION OF PREFERRED EMBODIMENTS

The following detailed description refers to the accompanying drawings. The same reference numbers in different drawings may identify the same or similar elements.

Figure 1A:
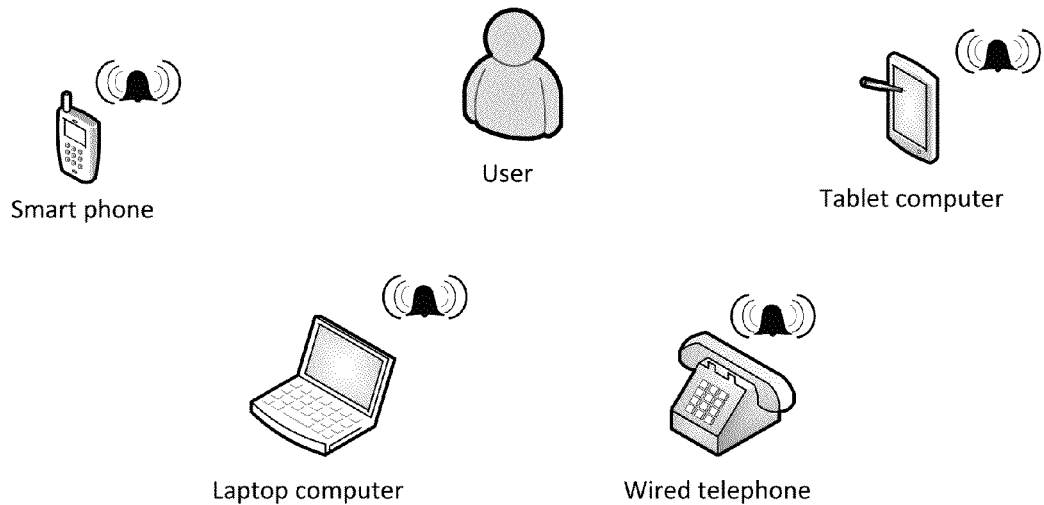
FIGS. 1A-1D illustrate an example overview of one or more implementations described herein.

Techniques described herein may allow for the generation of a unified call log, in order to enhance the user experience of users who use more than one device for sending and receiving telephone calls. For example, as shown in FIG. 1A, a user may be associated with several devices that are capable of receiving telephone calls, such as a smart phone, a laptop computer, a wired telephone, and a tablet computer. These multiple devices may be associated with a telephony service that rings all these devices simultaneously when an incoming call is delivered to the user. For example, the user may have subscribed to a "blast," or "call blast," service provided by a telephony service provider. As shown in FIG. 1A, a call may be incoming for the user, and the illustrated devices may simultaneously ring.

Figure 1B:
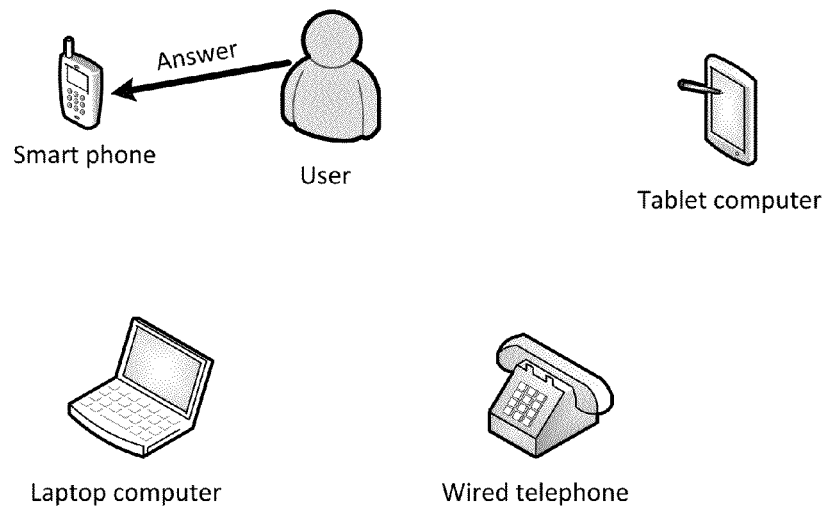
Figure 1C:
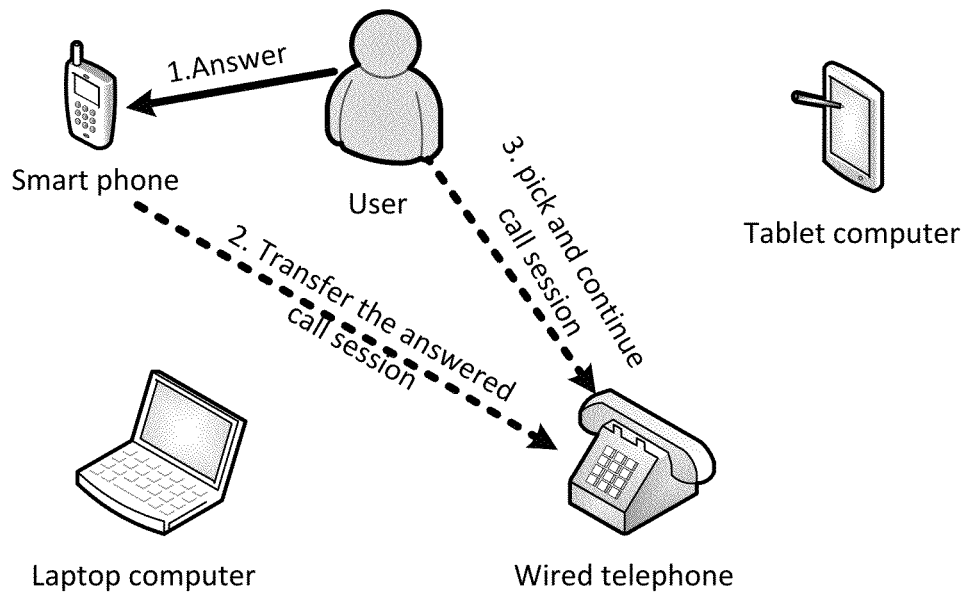
Figure 1D:
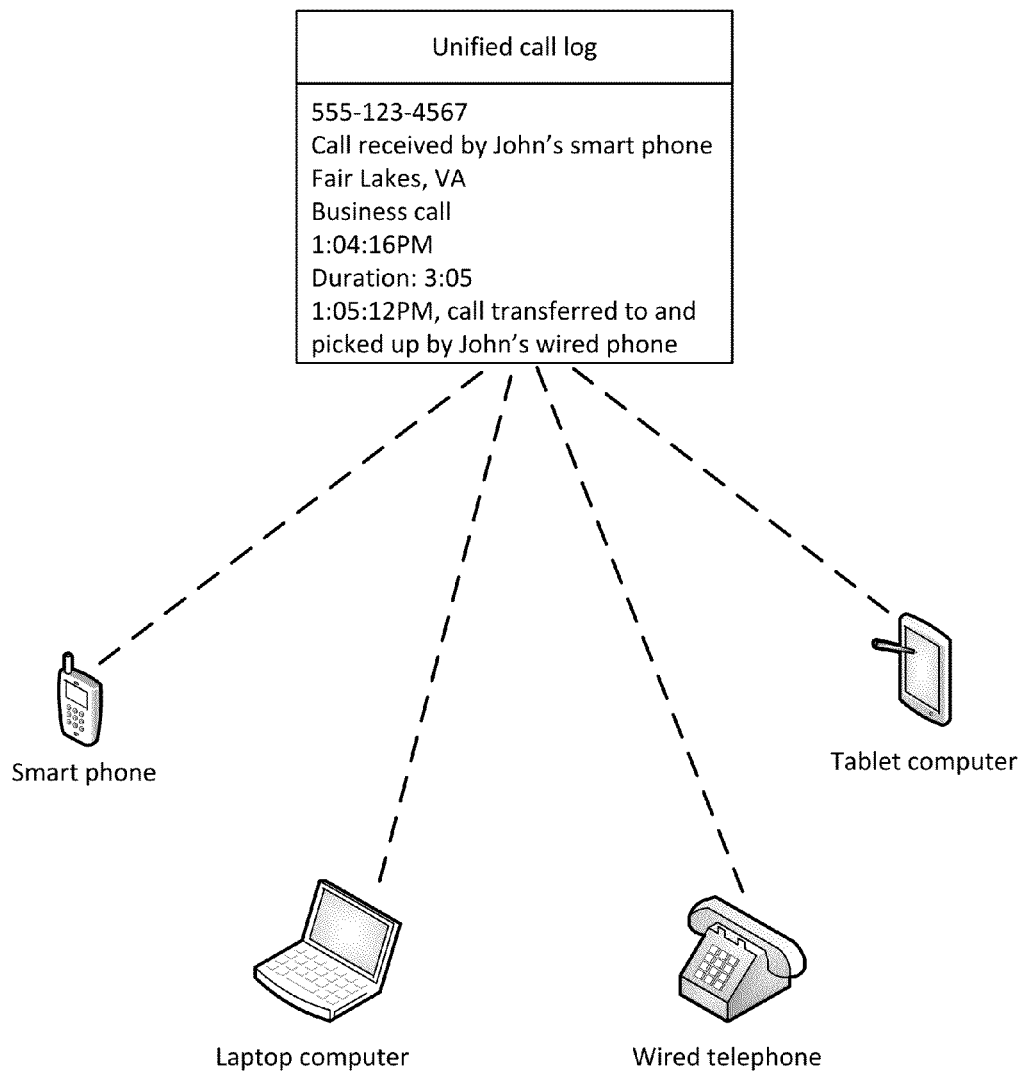

As shown in FIG. 1B, the user may choose to answer the call using the smart phone. The user may transfer the answered call session from one device to another device, from the smart phone to the wired phone, for example, as shown in FIG. 1C, during the life time of the call. In accordance with some implementations, and as shown in FIG. 1D, all of the devices may store a unified call log, indicating that the user answered the call using the smart phone. As shown, the unified call log may indicate information, such as the telephone number from which the call was received ("555-123-4567"), an identification of which device answered the call ("Call received by John's smart phone"), information regarding the location at which the call was answered ("Fair Lakes, VA"), a tag associated with the call ("Business call"), a time at which the call was answered ("1:04:16PM"), a duration of the call ("3:05"), and times at which the call was transferred and/or picked up by another device ("1:05:12PM, call picked up by John's wired phone"). By storing a unified call log, the user's experience may be enhanced, in that the user may have an accurate account of his or her telephone call records, regardless of the device he or she uses to answer calls.

Figure 2:
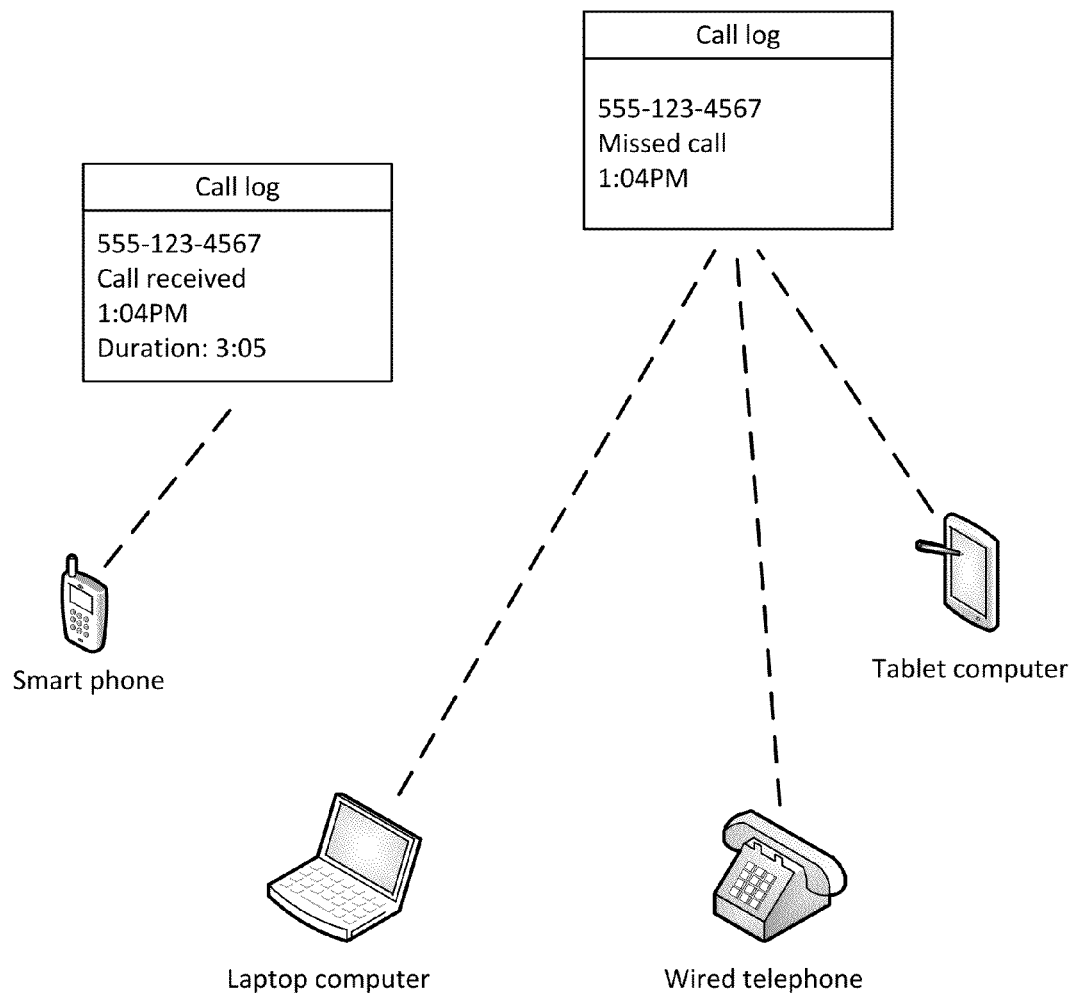
FIG. 2 illustrates a situation that may occur when a unified call log is not used.

FIG. 2 illustrates an example situation in which a unified call log is not stored. For example, assume that, as shown in FIGS. 1A and 1B, multiple devices ring, and the user answers the smart phone. In situations where a unified call log is not stored, and as shown in FIG. 2, the smart phone may store a call log, including information regarding the call that was answered at the smart phone. However, due to the absence of a unified call log, the other devices (i.e., the laptop computer, the wired telephone, and the tablet computer) may store a "missed call" notification. In this situation, the user may not have an accurate depiction of his or her call activity stored at any particular place. Implementations described herein may provide unified call logs, thus eliminating the confusion or uncertainty that may arise for a user when different devices store different call information.

Figure 3:
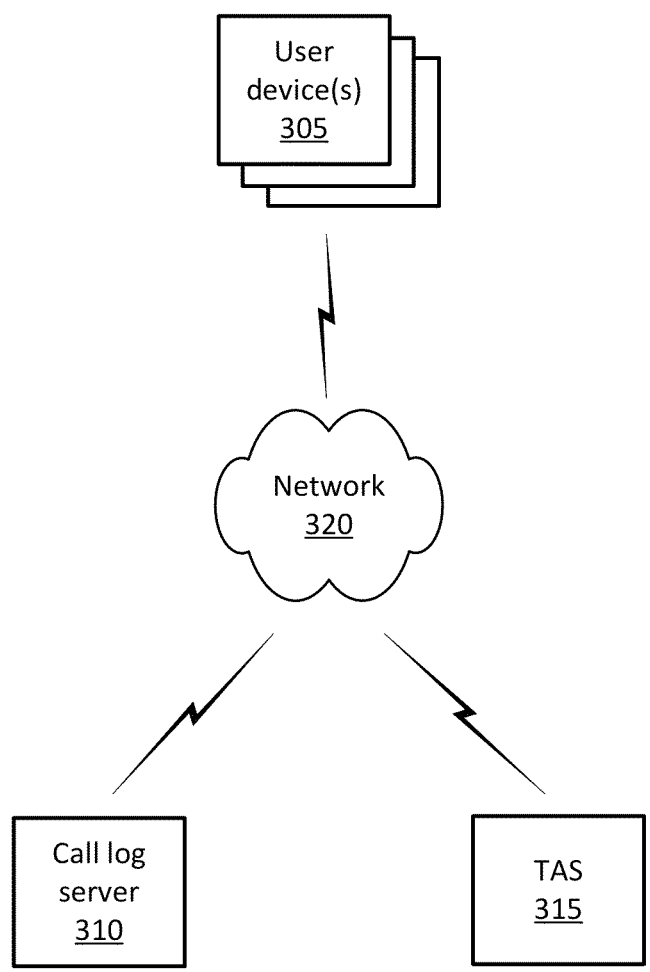
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include one or more devices 305, call log server 310, telephony application server ("TAS") 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environments 300. Devices of environment 200 may interconnect with each other and/or other devices via wired connections, wireless connections, or a combination of wired and wireless connections.

User device 305 may include any computation and communication device, such as a wireless mobile communication device that is capable of communicating with one or more networks (e.g., networks 320). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, a wearable device (e.g., as described in United States Patent Application Publication No. 2013/0086633), and/or another type of mobile computation and communication device.

Call log server 310 may include a server device, or a collection of server devices, that store, process, and forward data. For example, call log server 310 may receive information regarding calls, and/or may receive call log information, and may generate and/or distribute call log information to multiple associated user devices 305. In some implementations, call log server 310 may be used to perform "sync" operations, to ensure that multiple associated user devices 305 store the same call log information (e.g., a unified call log).

TAS 315 may include a server device, or a collection of server devices, that store, process, and forward data. For example, TAS 315 may perform telephony-related services, such as call setup and handling, presence, address book services, charging, and/or other services. In some implementations, TAS 315 may be communicatively coupled to, or may be incorporated in, an IMS network.

Network 320 may include one or more networks, via which user device 305, call log server 310, and/or TAS 315 may communicate. For example, network 320 may include an evolved packet system ("EPS") that includes a Long Term Evolution ("LTE") network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an eNodeB ("eNB"), via which user device 305 and/or another device may communicate with the EPC network. The EPC network may include one or more serving gateways ("SGWs"), mobility management entities ("MMEs"), and/or packet data network ("PDN") gateways ("PGWs"), and may enable user device 205 to communicate with a PDN (e.g., the Internet) and/or an IP Multimedia Subsystem ("IMS") core network. The IMS core network may manage authentication, session initiation, account information, a user profile, etc. associated with user device 305. Network 320 may additionally, or alternatively, include a wide area network ("WAN"), a metropolitan area network ("MAN"), the Internet, a fiber optic-based network, and/or a combination of these or other types of networks. In some implementations, network 320 may be communicatively coupled to one or more other networks.

FIG. 4 illustrates example data structures 400-1 through 400-N (where N is an integer greater than or equal to 1, the data structures sometimes herein being referred to collectively as "data structures 400," or individually as "data structure 400"), which may be used to store information regarding multiple devices that are associated with a particular user. For example, one instance of data structure 400 (e.g., data structure 400-1) may pertain to one particular user, while another instance of data structure 400 (e.g., data structure 400-N) may pertain to a different user. In some implementations, data structure 400 may be stored by call log server 310, TAS 315, and/or another device. Thus, in some such implementations, call log server 310 and/or TAS 315 may store N instances of data structure 400 for N users.

For example, as illustrated, data structure 400-1 may include a user identifier ("User ID") of "John@foo.com." While a specific format for the user identifier is shown in FIG. 4, in practice, any type or types of user identifiers may be used to identify the user, such as an IP address, a Session Initiation Protocol ("SIP") identifier, a telephone number, an International Mobile Equipment Identity ("IMEI"), and/or another identifier. Also, while not shown, data structure 400 may include other information regarding the user, such as first and last name, home address, work address, custom tags, and/or other information.

Data structure 400 may also include information regarding user devices 305 that are associated with the user. The information may include, for example, an identifier of each user device 305 ("Device ID"), a nickname for the device, and/or other information. For instance, as shown, the device identifier for a particular user device 305 may include an IP address. In some implementations, the device identifier may include additional or different identifying information (e.g., a Media Access Control ("MAC") address, an IMEI number, and/or other identifying information). The device identifier and/or the device nickname may be provided by the user, and/or with the user's consent (e.g., during registration with a service provider associated with call log server 310). For example, the user may register his or her user devices 305 with call log server 310 via a web portal, through interfaces provided on the user devices 305 themselves, and/or using some other technique.

Figure 5:
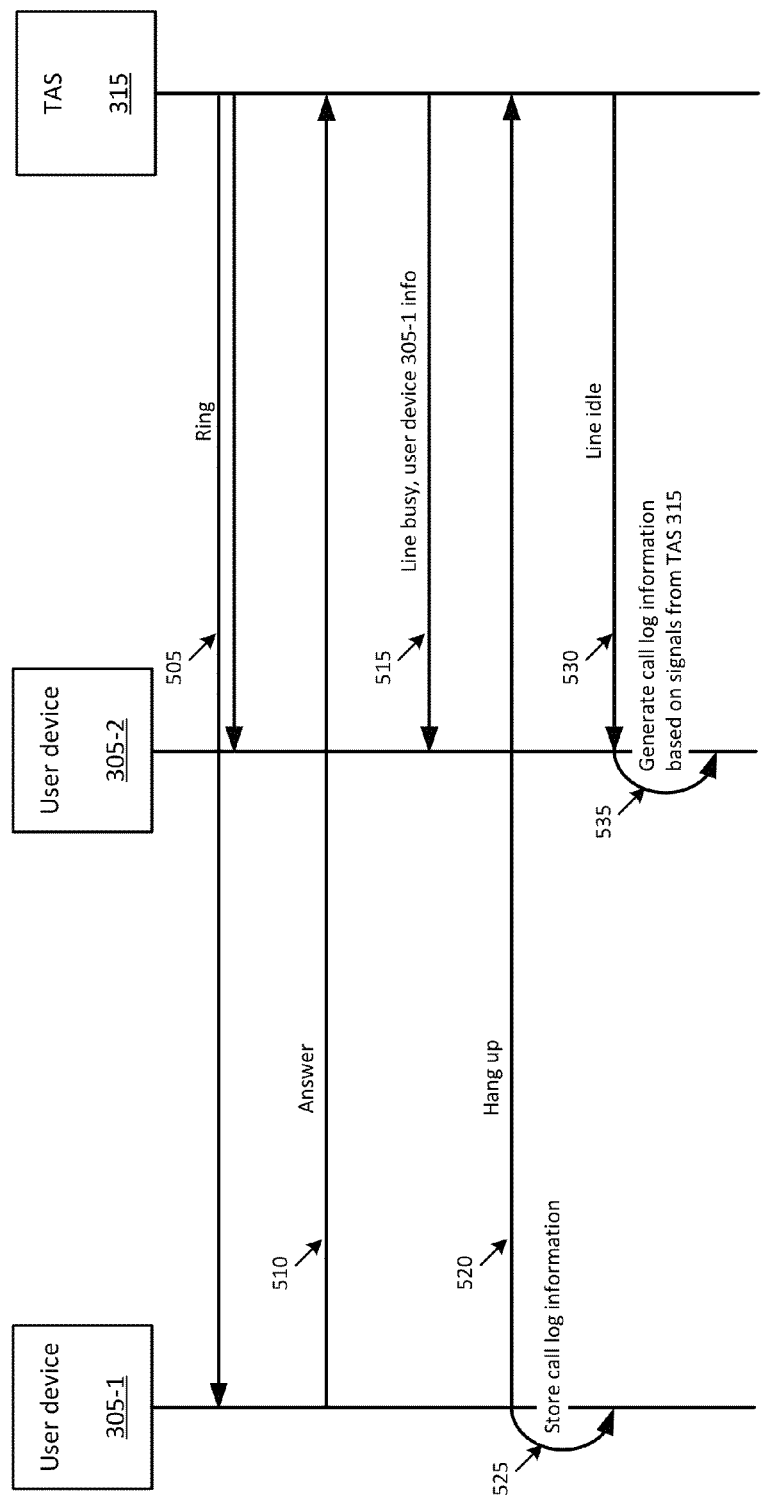
FIGS. 5, 6A, 6B, 7A, and 7B illustrate example signal flows for generating and storing unified call log information, according to some implementations.
Figure 6A:
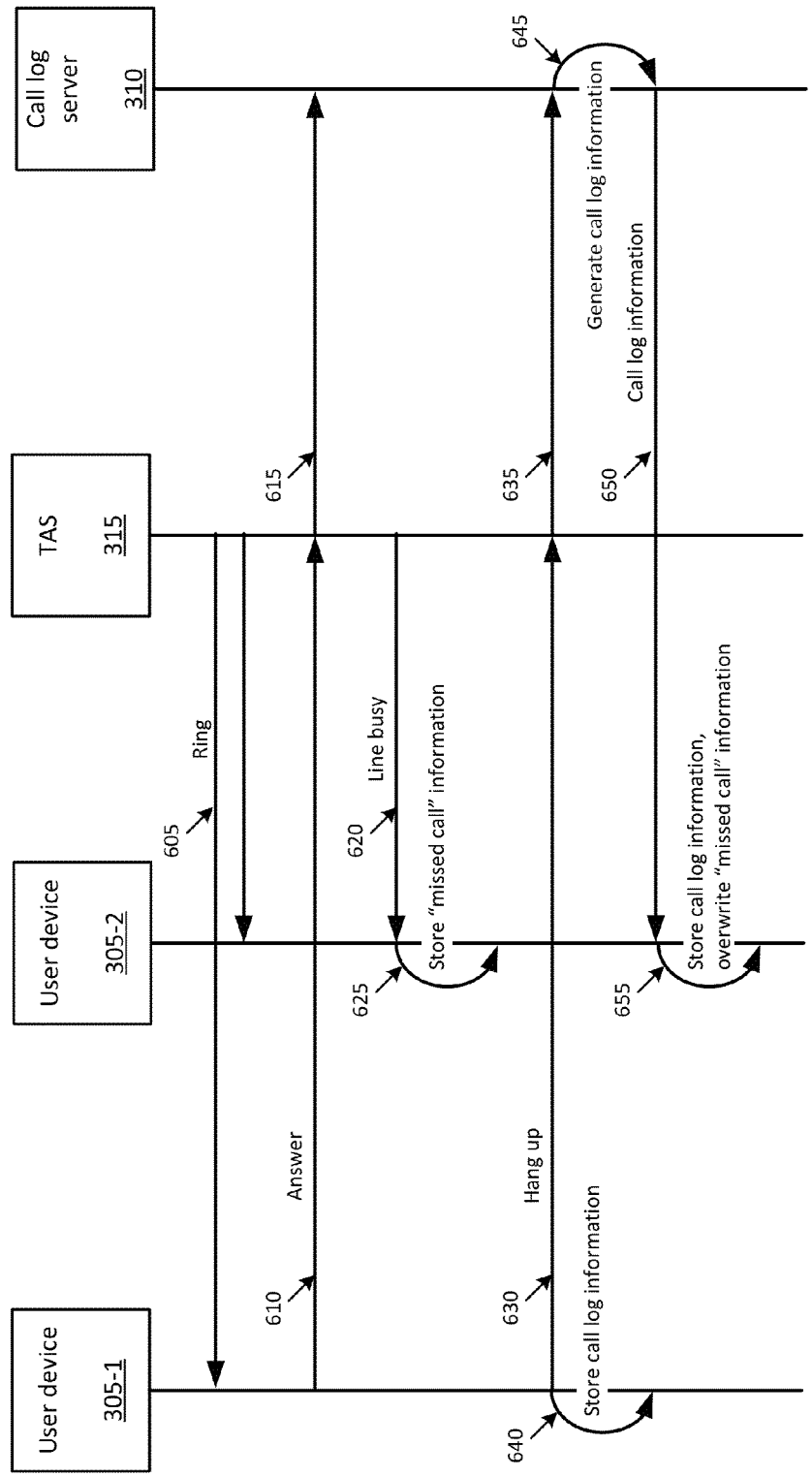
Figure 6B:
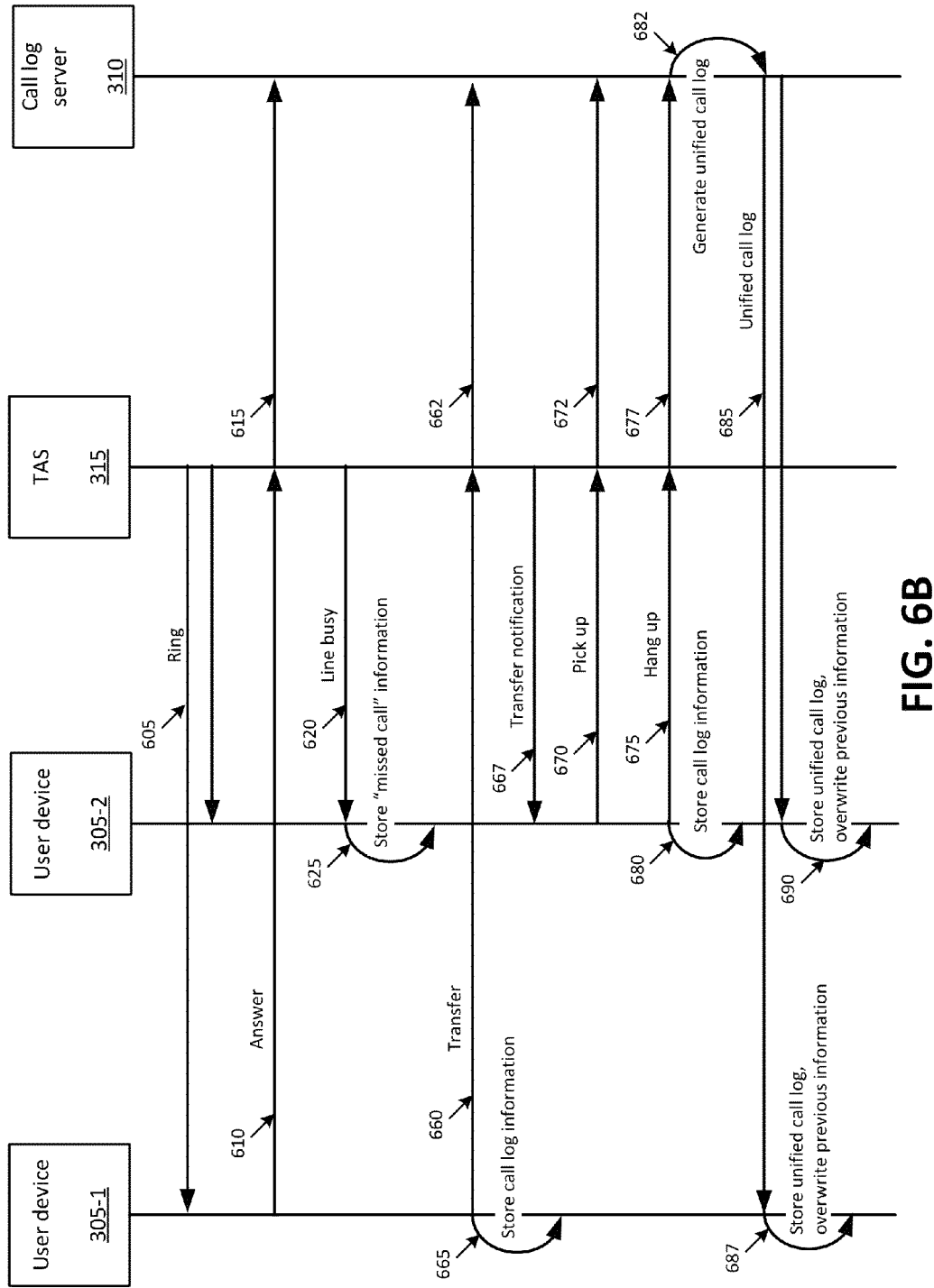
Figure 7A:
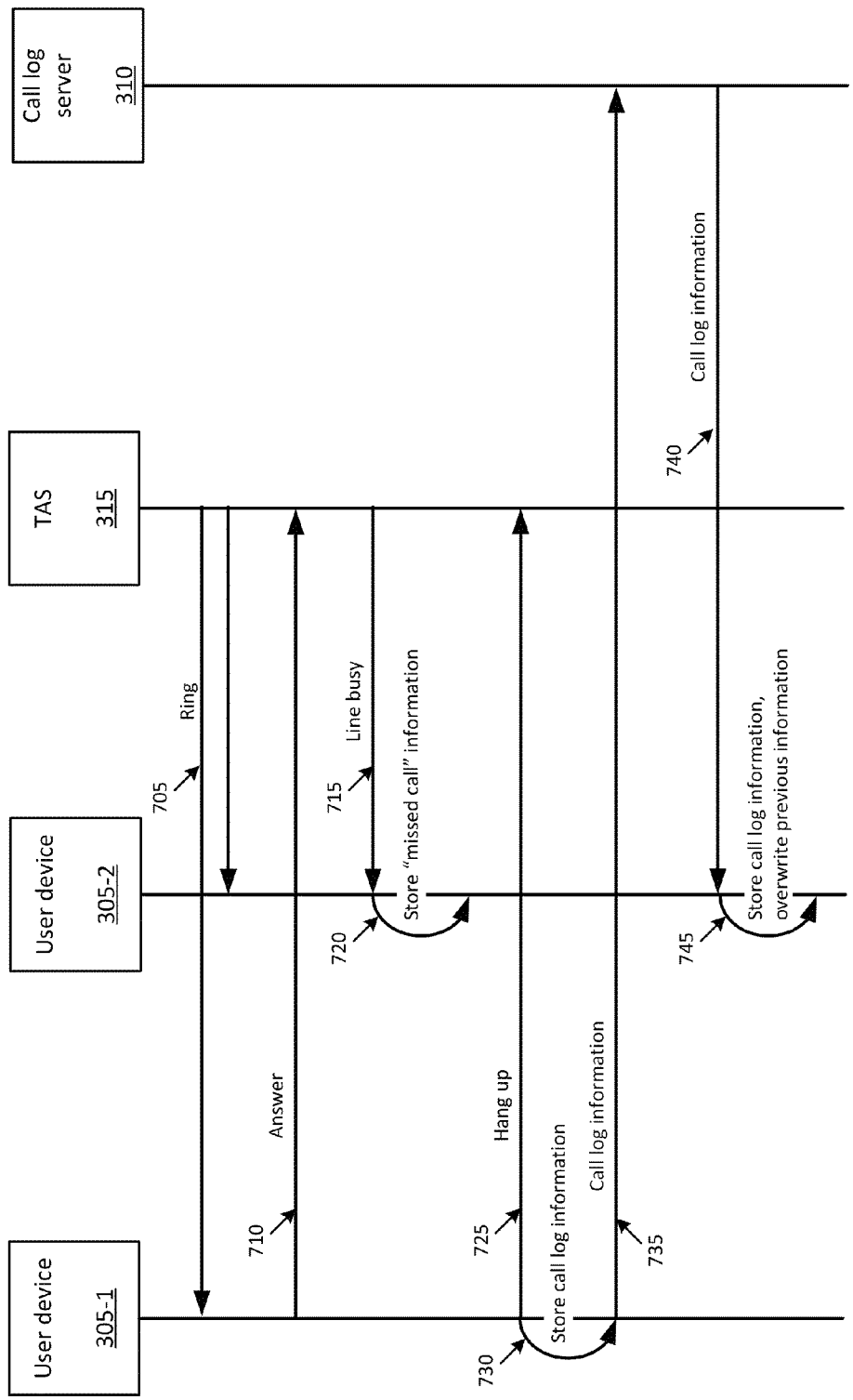
Figure 7B:
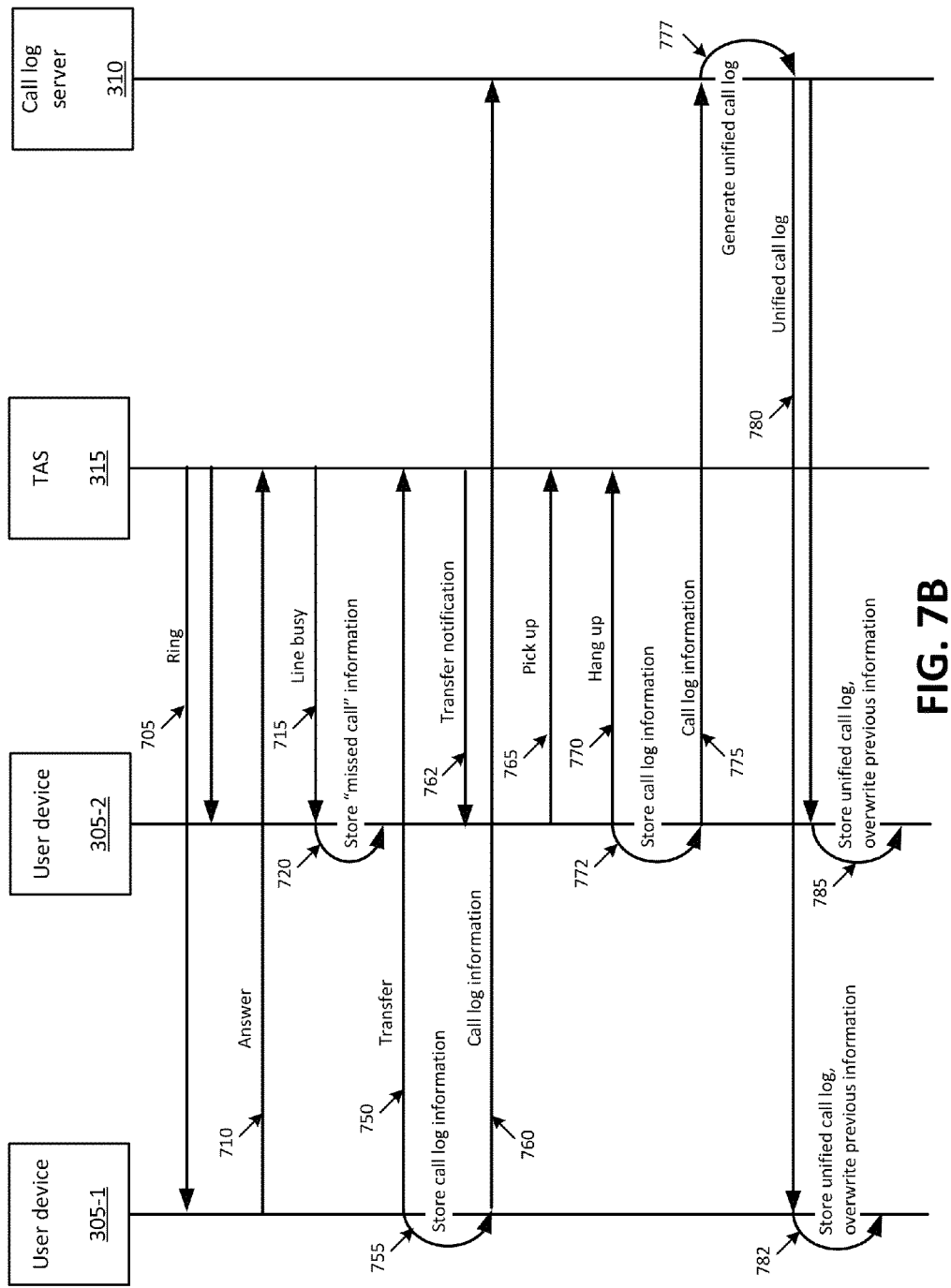

FIGS. 5-7B illustrate example signals for generating unified call log. For example, FIG. 5 illustrates an example implementation in which a particular user device 305 may generate a unified call log based on signals indicating that another user device 305 has answered a call. FIGS. 6A and 6B illustrate example implementations in which call log server 310 may generate unified call logs based on signals provided by TAS 315, and FIGS. 7A and 7B illustrate example implementations in which call log server 310 may generate unified call logs based on signals provided by user device 305.

In some implementations, the various signals shown in these figures may be signals according to Signaling System 7 ("SS7"), SIP, and/or another protocol. Thus, while the general functionality of the signals is described in these figures, in practice, additional, different, or fewer signals may be used. For example, in practice, the actual signals implemented may have different names than the signals illustrated in the figures. As another example, signals illustrated by one arrow in these figures (e.g., "ring" at 505, 605, and 705; "answer" at 510, 610, and 710; and "hang up" at 520, 630, and 725) may represent multiple signals, potentially including well-known sets of signals, to accomplish the functionality conceptually illustrated in these figures. For instance, "ring" and "answer" signals, shown in these figures, may represent multiple signals being sent by or on behalf of respective devices, such as several SIP signals (e.g., SIP INVITE signals, SIP ACK ("acknowledgment") signals, etc.), several SS7 signals (e.g., an IAM ("initial address message") signal, an ACM ("address complete message"), etc.).

Further, FIGS. 5-7B are illustrated in the context of a set of two user devices 305. In practice, similar techniques may be performed for groups of more than two (e.g., three, four, ten, etc.) user devices 305. For instance, signals shown in these figures as being sent to or from user device 305-2 may be sent to or from additional user devices 305.

Some signals in FIGS. 5-7B may be similar or identical to other signals in FIGS. 5-7B. For the sake of brevity, these similar or identical signals may not be described in detail multiple times below.

As shown in FIG. 5, TAS 315 may output (at 505) a "ring" signal to user devices 305-1 and 305-2. Assume, for example, that user devices 305-1 and 305-2 are associated with a "blast" feature, whereby both user devices 305-1 and 305-2 may answer calls to a particular telephone number or subscriber. The "ring" signal (outputted at 505) may indicate an incoming call for the telephone number or subscriber. As mentioned above, in situations where more than two user devices 305 are associated with the telephone number or subscriber, the "ring" signal (outputted at 505) may be provided to the additional user devices 305 as well.

Assume that user device 305-1 is used to answer the call. For example, a user may chose to answer the call, or "pick up," using user device 305-1. Based on answering the call, user device 305-1 may output (at 510) an "answer" signal, indicating that the call has been answered by user device 305-1. In some implementations, the "answer" signal may be a well-known signal. In other implementations, the "answer" signal may include information not commonly included in an "answer" signal, such as a nickname of user device 305-1, a geographic location of user device 305-1, and/or other information.

TAS 315 may output (at 515) a "line busy" signal (e.g., a signal indicating that a conceptual telephone line, associated with user devices 305-1 and 305-2, is in an active call state) to user device 305-2. As mentioned above, in situations where more than two user devices 305 are associated with the telephone number or subscriber, the "line busy" signal (outputted at 515) may be provided to the additional user devices 305 as well. In some implementations, the "line busy" signal may also be provided to user device 305-1. The "line busy" signal may include information regarding user device 305-1, such as information included in, or otherwise determined based on, the "answer" signal (provided at 510). For example, TAS 315 may use information stored in data structure 400 to identify a nickname of user device 305-1, based on a device identifier (e.g., IP address, MAC address, and/or another identifier) included in the "answer" signal. In some implementations, the "line busy" signal may include information included in the "answer" signal, such as an identifier of user device 305-1 (e.g., IP address, MAC address, etc.).

User device 305-2 may store the information, regarding user device 305-1, provided at 515. In some implementations, user device 305-2 may identify additional information, based on the information received at 515. For example, assume that the information, provided at 515, includes a device identifier associated with user device 305-1. In some such implementations, user device 305-2 may identify a nickname, or other information, associated with user device 305-1, based on the device identifier. For example, user device 305-2 may store data structure 400, and/or may communicate with another device that stores data structure 400, in order to obtain the nickname or other information. User device 305-2 may also store information regarding the received "line busy" signal, such as a time at which the signal was received by user device 305-2, or a time at which the signal was outputted by TAS 315.

Upon conclusion of the call (e.g., when a user associated with user device 305-1 "hangs up"), user device 305-1 may output (at 520) a "hang up" signal. User device 305-1 may also store call log information, which may include information regarding the call (e.g., caller's telephone number, duration of call, time of call, etc.).

Based on receiving the "hang up" signal, TAS 315 may output (at 530) a "line idle" signal. The "line idle" signal may indicate that the call has ended, and that user devices 305-1 and 305-2 may be used to place calls or to receive additional calls.

Based on receiving the "line idle" signal, user device 305-2 may generate (at 535) call log information, based on the signals received from TAS 315 (e.g., the signals received at 515 and 530). For example user device 305-2 may generate a unified call log, indicating that user device 305-1 answered the call. The unified call log may further indicate a time at which the call was answered (e.g., based on a time at which the "ring" signal was received (at 505) and/or based on a time at which the "line busy" signal was received (at 515) by user device 305-2), a duration of the call (e.g., based on the time at which the call was answered and a time at which the "line idle" signal was received (at 530)), and/or other information (e.g., information provided in or determined based on information provided at 515).

In some implementations, user device 305-2 may be configured to forgo generating a call log (e.g., a "missed call" log) when the "line busy" signal is received at 515. In other implementations, user device 305-2 may be configured to generate a "missed call" log when the "line busy" signal is received at 515. In some such implementations, the unified call log (generated at 535) may be stored by user device 305-2 in lieu of the "missed call" log. For instance, user device 305-2 may overwrite the "missed call" log with the unified call log.

As mentioned above, FIG. 6A illustrates another example implementation, in which a unified call log may be generated. As shown in FIG. 6A, TAS 315 may output (at 605) a "ring" signal to user devices 305-1 and 305-2, and user device 305-1 may output (at 610) an "answer" signal to TAS 315. In accordance with some implementations, TAS 315 may forward (at 615) the "answer" signal (and/or may otherwise notify call log server 310 regarding the "answer" signal) to call log server 310. Call log server 310 may store information regarding the "answer" signal, such as a device identifier associated with user device 305-1, a time at which the "answer" signal was received, etc.

Based on receiving the "answer" signal, TAS 315 may output (at 620) a "line busy" signal to user device 305-2. User device 305-2 may store (at 625) "missed call" information, indicating that user device 305-2 received (at 605) a "ring" signal, but did not answer the call.

Upon completion of the call, user device 305-1 may output a "hang up" signal to TAS 315, which may forward (at 635) the "hang up" signal (or information regarding the "hang up signal") to call log server 310. Call log server may generate (at 645) unified call log information, based on the signals received from TAS 315 (e.g., the signals received at 635). For example, the unified call log information may indicate a time at which the call was received, a duration of the call, an identifier of user device 305-1, and/or other information.

Call log server 310 may output (at 650) the generated unified call log information to user device 305-2. User device 305-2 may store (at 655) the received unified call log information, and may overwrite the "missed call" information (stored at 625). In alternate implementations, user device 305-2 may be configured to omit the storing of the "missed call" information. In these alternate implementations, user device 305-2 may store (at 655) the unified call log information, without needing to overwrite "missed call" information.

FIG. 6B illustrates an example of generating a unified call log, that indicates that a call was transferred to another device, based on signals received from TAS 315. As shown in FIG. 6B, TAS 315 may output (at 605) a "ring" signal to user devices 305-1 and 305-2, user device 305-1 may output (at 610) an "answer" signal to TAS 315, TAS 315 may forward (at 615) the "answer" signal to call log server 310, and call log server 310 may store information regarding the "answer" signal. Based on receiving the "answer" signal, TAS 315 may output (at 620) a "line busy" signal to user device 305-2, and user device 305-2 may store (at 625) "missed call" information.

User device 305-1 may output (at 660) a "transfer" signal, indicating that the call should be transferred (e.g., to user device 305-2). For example, a user of user device 305-1 may select a "transfer call" option. TAS 315 may forward (at 662) a notification to call log server 310, indicating that that the "transfer" signal was received from user device 305-1. As described below, this notification may be used by call log server 310 to generate a unified call log. User device 305-1 may store (at 665) call log information, indicating that the call was transferred. In some implementations, the call log information may indicate that the call has ended.

TAS 315 may output (at 667) a transfer notification to user device 305-2, indicating that the call has been transferred. User device 305-2 may output (at 670) a "pick up" notification, indicating that user device 305-2 has been used to pick up the transferred call. TAS 315 may forward (at 672) the "pick up" notification to call log server 310.

Upon completion of the call, user device 305-2 may output (at 675) a "hang up" notification to TAS 315, which may forward (at 677) the "hang up" notification to call log server 310. User device 305-2 may store (at 680) call log information, indicating that the transferred call was received and conducted at user device 305-2. For example, the call log information (stored at 680) may include a time the call was placed, a duration of the call, and/or a telephone number associated with a caller from which the call was received. At this point, user device 305-2 may be storing call log information for the missed call and the transferred call (i.e., the information stored at 625 and 680). That is, user device 305-2 may store call log information for two distinct calls (e.g., a missed call and a transferred call), and user device 305-1 may store call log information for a third distinct call (e.g., the call answered at 610 and transferred at 660). This may be undesirable, as from the user's perspective, the user may feel that he or she has actually carried on one phone call.

Call log server 310 may generate (at 682) unified call log information. The unified call log information may be based on the information received at 615, 662, 672, and 677. For instance, the unified call log information may indicate a time that the call was received by user device 305-1, a duration of the call at user device 305-1, a time that the call was transferred, a time that the call was answered by user device 305-2, a duration of the transferred call at user device 305-2, an identifier associated with user devices 305-1 and/or 305-2 (e.g., along with an indication that the call was originally answered by user device 305-1 and subsequently transferred to user device 305-2), and/or other information. Call log server 310 may output (at 685) the generated unified call log to user devices 305-1 and 305-2. User devices 305-1 and 305-2 may store (at 687 and 690, respectively) the call log information. In some implementations, user devices 305-1 and/or 305-2 may overwrite the previous information (e.g., information stored at 665, 625, and/or 680) with the unified call log received at 685.

As shown in FIG. 7A, TAS 315 may output (at 705) a "ring" signal to user devices 305-1 and 305-2, user device 305-1 may output (at 710) an "answer" signal to TAS 315, TAS 315 may output (at 715) a "line busy" signal to user device 305-2, and user device 305-2 may store (at 720) "missed call" information. Upon completion of the call, user device 305-1 may output (at 725) a "hang up" signal to TAS 315, and may store (at 730) call log information regarding the call.

User device 305-1 may output (at 735) information regarding the call log to call log server 310. For example, user device 305-1 may output a device identifier associated with user device 305, information regarding a geographic location of user device 305-1, a time that the call was received, a duration of the call, a custom tag associated with the call, and/or other information.

Call log server 310 may identify that user device 305-2 is associated with user device 305-1 based on, for example, information in data structure 400. Call log server 310 may provide some or all of the received call log information (received at 735) to user device 305-2, which may store (at 745) the call log information. In some implementations, when storing the call log information, user device 305-2 may overwrite the "missed call" information.

As shown in FIG. 7B, TAS 315 may output (at 705) a "ring" signal to user devices 305-1 and 305-2, user device 305-1 may output (at 710) an "answer" signal to TAS 315, TAS 315 may output (at 715) a "line busy" signal to user device 305-2, and user device 305-2 may store (at 720) "missed call" information.

User device 305-1 may output (at 750) a "transfer" signal to TAS 315, and may store (at 755) call log information indicating that the call was transferred. User device 305-1 may also output (at 760) the call log information to call log server 310. As described below, call log server 310 may use the call log information to generate a unified call log. TAS 315 may output (at 762) a "transfer" notification to user device 305-2, and user device 305-2 may output (at 765) a "pick up" signal to TAS 315. Upon completion of the call, user device 305-2 may output (at 770) a "hang up" signal to TAS 315, and may store (at 772) call log information regarding the call. User device 305-2 may output (at 775) the call log information to call log server 310. Call log server 310 may generate (at 777) a unified call log, based on the call log information received (at 760 and 775) from user devices 305-1 and 305-2. Call log server 310 may output (at 780) the generated unified call log to user devices 305-1 and 305-2. User devices 305-1 and 305-2 may store (at 782 and 785, respectively) the call log information. In some implementations, user devices 305-1 and/or 305-2 may overwrite the previous information (e.g., information stored at 720, 755, and/or 782) with the unified call log received at 780.

While FIGS. 5-7B illustrate examples in which an incoming call is received for user device 305-1, similar techniques may be used for calls that are placed by user device 305-1. For example, referring to FIG. 5, assume that a "ring" signal and an "answer" signal are not sent (at 505 and 510, respectively). Instead, assume that user device 305-1 places a call. Based on receiving a signal indicating that user device 305-1 has placed a call, TAS 315 may output a "line busy" signal (at 515), similar to as described above. Similarly, referring to FIG. 6A, the "ring" and "answer" signals (at 605 and 610, respectively) may be replaced with a signal indicating that user device 305-1 has placed a call, and similar concepts may apply to the examples shown in FIGS. 6B-7B.

Figure 8:
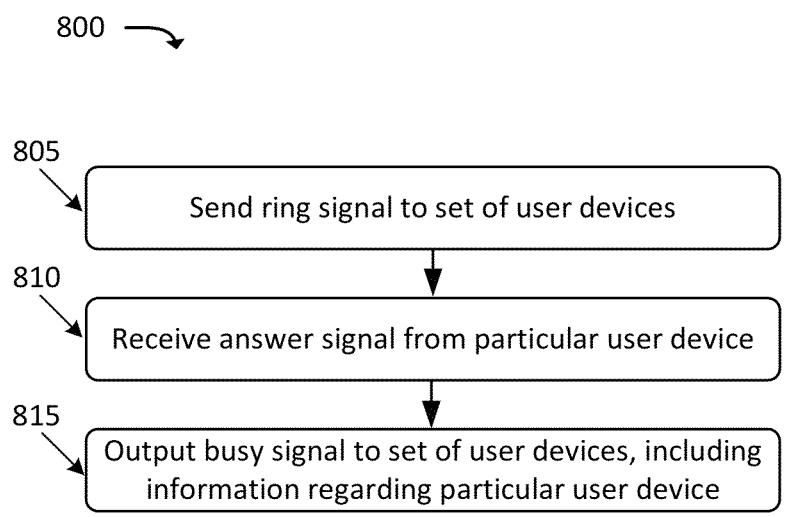
FIGS. 8-10 illustrate example processes for generating and storing unified call log information, according to some implementations.
Figure 9:
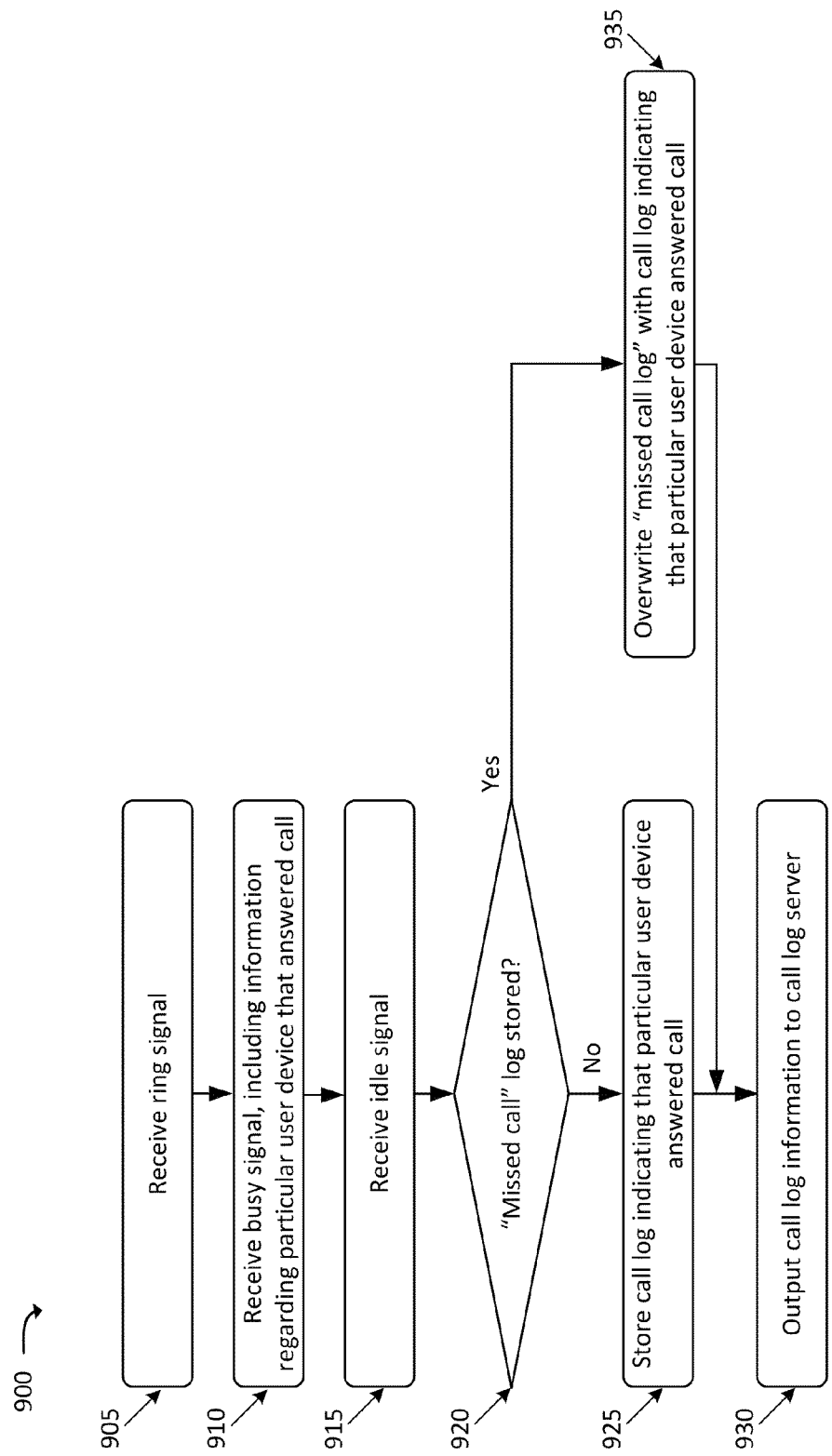
Figure 10:
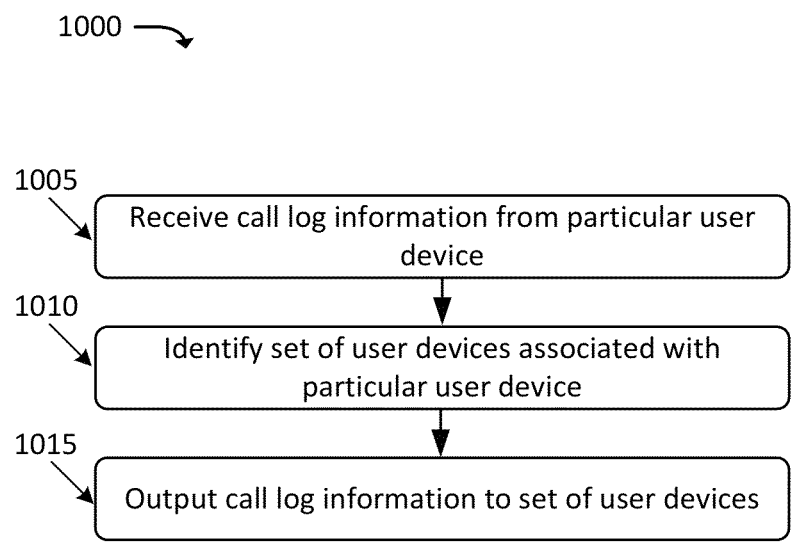

FIGS. 8-10 illustrate example processes 800, 900, and 1000 for generating unified call logs, in accordance with one or more implementations. For example, FIG. 8 illustrates an example process 800 for providing an enhanced "busy" signal to a set of user devices, which may use the enhanced "busy" signal to generate unified call logs. FIG. 9 illustrates an example process 900 for generating a unified call log, by a user device that did not answer a call. FIG. 10 illustrates an example process 1000 for syncing unified call logs across a set of user devices.

Like FIGS. 5-7B, FIGS. 8-10 illustrate examples in which an incoming call is received. However, as similarly described above, concepts described in FIGS. 8-10 may apply for calls that are placed by particular user devices 305 that are in a group of user devices 305.

Referring to FIG. 8, process 800 may, in one example implementation, be performed by TAS 315. In other implementations, some or all of process 800 may be performed by one or more other devices in lieu of, or in conjunction with, TAS 315.

Process 800 may include sending a "ring" signal to a set of user devices (block 805). For example, as described above, TAS 315 may receive a call intended for a particular subscriber or telephone number that is associated with a "blast" service or a similar service. TAS 315 may send a "ring" signal to a set of user devices 305 associated with the particular subscriber or telephone number, to indicate that an incoming call has been placed.

Process 800 may also include receiving an "answer" signal from a particular user device, of the set of user devices (block 810). For example, as described above, a particular user device 305 may indicate that the particular user device 305 has answered, or "picked up," the call. As also described above, in some implementations, the "answer" signal may be an enhanced "answer" signal that includes information not typically included in "answer" signals, such as a nickname associated with the device, a geographic location of the device, a custom tag associated with the device, and/or other information.

Process 800 may further include outputting a "busy" signal to the set of user devices, including information regarding the particular user device that answered the call (block 815). For example, TAS 315 may output a "busy" signal to one or more user devices 305, associated with the subscriber and/or the telephone number, that did not answer the call. As mentioned above, the "busy" signal may be an enhanced "busy" signal that includes information not typically included in "busy" signals, such as a nickname associated with the device, a geographic location of the device, a custom tag associated with the device, and/or other information. In some implementations, when generating the "busy" signal, TAS 315 may identify information (e.g., stored information, such as information in data structure 400) associated with information received in the "answer" signal. In some implementations, when generating the "busy" signal, TAS 315 may include some or all of the information included in the "answer" signal. As mentioned above, the enhanced "busy" signal may be used by user devices 305 to generate a unified call log.

Referring to FIG. 9, process 900 may, in one implementation, be performed by user device 305 (e.g., a particular user device 305 that does not answer a call). In other implementations, some or all of process 900 may be performed by one or more other devices in lieu of, or in conjunction with, user device 305.

Process 900 may include receiving a "ring" signal (block 905). For example, as described above, user device 305 may receive a "ring" signal, indicating that an incoming call has been placed for a subscriber or telephone number associated with user device 305. As also mentioned above, assume that the subscriber or telephone number is associated with a "blast" feature, in which multiple user devices 305 are notified when incoming calls are received.

Process 900 may also include receiving a "busy" signal, including information regarding a particular user device that answered the call (block 910). For example, as mentioned above, user device 305 may receive a "busy" signal when another user device 305 has answered the call. As also mentioned above, the "busy" signal may be an enhanced "busy" signal that includes information not commonly included in "busy" signals, such as information regarding the particular user device 305 that answered the call (e.g., a device identifier associated with the particular user device 305, a nickname associated with the particular user device 305, a geographic location of the particular user device 305, etc.). The "busy" signal may correspond to, for example, the "busy" signal outputted at block 815 of FIG. 8.

Process 900 may further include receiving an "idle" signal (block 915). For example, as described above, user device 305 may receive a signal indicating that the call has ended. The "idle" signal may additionally, or alternatively, indicate that user device 305 may be used to place or receive calls.

Process 900 may additionally include determining whether a "missed call" log has been stored (block 920). For example, user device 305 may determine whether user device 305 has stored a "missed call" log, based on determining that user device 305 did not answer the call. In some implementations, user device 305 may forgo making such a determination, and block 920 may be presented merely for conceptual purposes. For example, in implementations where block 920 is not performed, and where user device 305 is not configured not to store "missed call" logs when receiving a "ring" signal and then a subsequent "busy" signal (or enhanced "busy" signal), process 900 may transition from block 915 to 925. Similarly, in implementations where block 920 is not performed, and where user device 305 is configured to store "missed call" logs when receiving a "ring" signal and then a subsequent "busy" signal (or enhanced "busy" signal), process 900 may transition from block 915 to 935.

If a "missed call" log has not been stored (block 920—NO), then process 900 may include storing a call log indicating that the particular user device has answered the call (block 925). For example, the stored call log may be a unified call log that includes information regarding the particular user device 305 that answered the call, in addition to information regarding the call (e.g., duration of call, time of call, etc.).

Process 900 may further include outputting the call log information to a call log server (block 920—NO, block 930). For example, user device 305 may output the call log information to call log server 310 and/or another device. In some implementations, providing the call log information to call log server 310 may allow call log server 310 to ensure that all user devices 305, in the group, have a synced set of call logs. For instance, one user device 305 may experience an outage (e.g., a network outage, a power outage, etc.) while another user device 305 generates a unified call log. In some implementations, user device 305 may forgo performing block 930.

If, on the other hand, a "missed call" log has been stored (block 920—YES), then process 900 may include overwriting the "missed call" log with a call log indicating that the particular user device has answered the call (block 935). Process 900 may further include outputting the call log information to a call log server (block 920—YES, block 930), as described above.

Referring to FIG. 10, process 1000 may, in one example implementation, be performed by call log server 310. In other implementations, process 1000 may be performed by one or more other devices in addition to, or in lieu of, call log server 310.

Process 1000 may include receiving call log information from a particular user device (block 1005). For example, call log server 310 may receive call log information from one or more user devices 305 that have answered, and/or have not answered a call. For instance, the call log information may include information collected at a particular user device 305 regarding a call answered by the particular user device, and/or information generated by a particular user device 305 based on signals (e.g., "ring," "busy," and "idle" signals) that pertain to a call that was not answered by the particular user device 305.

Process 1000 may also include identifying a set of user devices associated with the particular user device (block 1010). For example, call log server 310 may identify other user devices 305, associated with the particular user device 305, based on information stored in data structure 400.

Process 1000 may include outputting the call log information to the set of user devices (block 1015). For example, call log server 310 may output the call log information to user devices 305, identified as being associated with the particular user device 305. In some implementations, call log server 310 may maintain one unified call log for the set of user devices 305, and may output the entire unified call log, while in some implementations, call log server 310 may output only updates to the call log. In some implementations, call log server 310 may perform conflict resolution in order to sync varying call log information received from different user devices 305. For example, if differing information (e.g., a different call duration) is received from different user devices 305, call log server 310 may select the information from a more authoritative user device 305 (e.g., the particular user device 305 that received the call).

Figure 11:
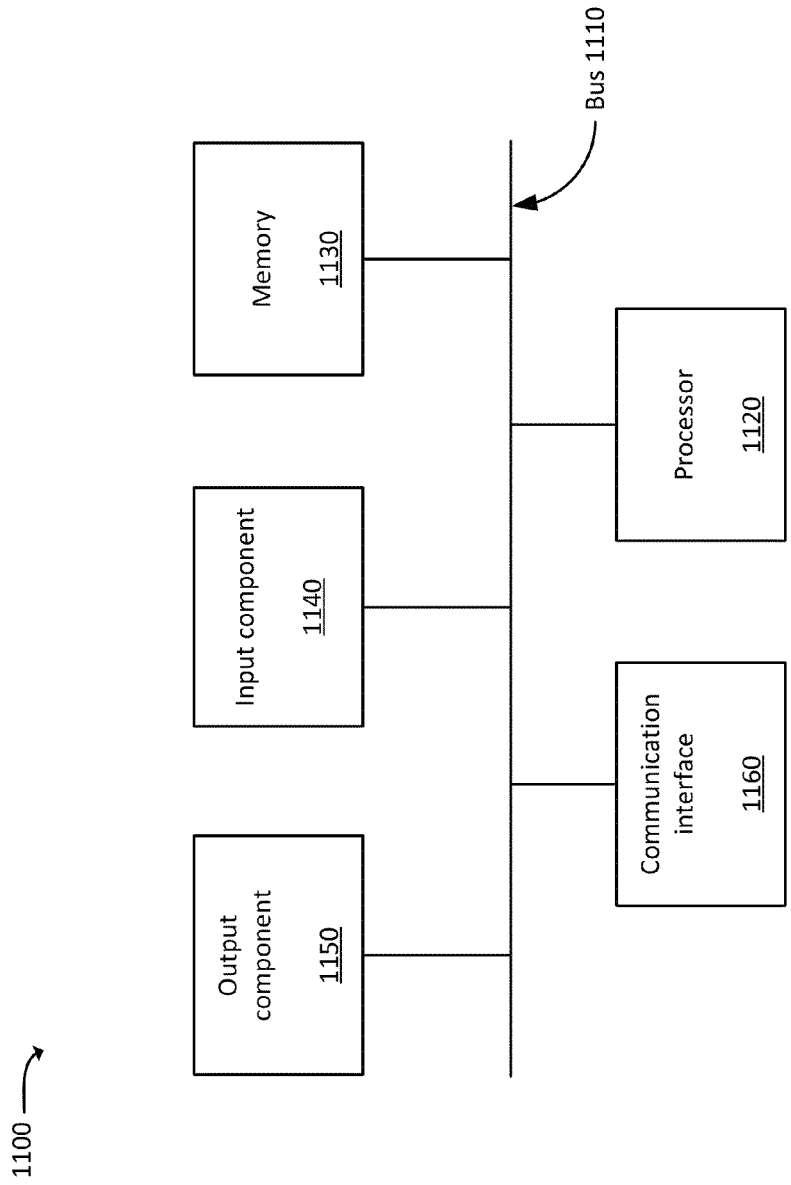
FIG. 11 illustrates example components of one or more devices, according to one or more implementations described herein.

FIG. 11 is a diagram of example components of device 1100. One or more of the devices described above (e.g., as described with respect to FIGS. 1A-1C, 2, 3, and 5-7B) may include one or more devices 1100. Device 1100 may include bus 1110, processor 1110, memory 1120, input component 1130, output component 1140, and communication interface 1160. In another implementation, device 1100 may include additional, fewer, different, or differently arranged components.

Bus 1110 may include one or more communication paths that permit communication among the components of device 1100. Processor 1110 may include a processor, microprocessor, or processing logic that may interpret and execute instructions. Memory 1120 may include any type of dynamic storage device that may store information and instructions for execution by processor 1110, and/or any type of non-volatile storage device that may store information for use by processor 1110.

Input component 1130 may include a mechanism that permits an operator to input information to device 1100, such as a keyboard, a keypad, a button, a switch, etc. Output component 1140 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1110 executing software instructions stored in a computer-readable medium, such as memory 1120. A computer-readable medium may be defined as a non-transitory memory device. A memory device may include space within a single physical memory device or spread across multiple physical memory devices. The software instructions may be read into memory 1120 from another computer-readable medium or from another device. The software instructions stored in memory 1120 may cause processor 1110 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 8-10, the order of the blocks may be modified in other implementations. Further, non-dependent blocks may be performed in parallel. In some implementations, additional blocks may be performed before, after, or in between the described blocks.

Additionally, while series of signals have been described with regard to FIGS. 5-7B, the order of the signals may be modified in other implementations. Also, non-dependent signals may be sent and/or received in parallel. In some implementations, additional signals may be transmitted before, after, or in between the described signals.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by a first user device, a signal indicating an incoming call;
    determining, by the first user device, that a second user device has answered the call;
    receiving, by the first user device, the answered call via a call transfer from the second user device to the first user device;
    answering, by the first user device, the transferred call;
    generating, by the first user device, call log information that indicates that the first user device has answered the transferred call;
    outputting, by the first user device, the generated call log information to a call log server device, the call log server device also receiving call log information from the second user device indicating that the call has been transferred from the second user device to the first user device, the call log server device further generating a unified call log regarding the call answered by the second user device and the transfer of the call to the first user device;
    receiving, by the first user device, the unified call log from the call log server device; and
    storing, in a memory associated with the first user device, the received unified call log.

2. The method of claim 1, wherein the first user device and the second user device are in a set of user devices associated with a call blast service,
    wherein the call blast service causes the set of user devices to contemporaneously receive the signal indicating the incoming call.

3. The method of claim 1, wherein determining that the second user device has answered the call includes:
    receiving a signal indicating that a line, associated with the first user device and the second user device, is in an active call state.

4. The method of claim 3, wherein receiving the signal, indicating that the line is in the active call state, includes receiving information regarding the second user device.

5. The method of claim 4, wherein the information regarding the second user device includes at least one of:
    a device identifier associated with the second user device,
    a nickname associated with the second user device, or
    information regarding a geographical location of the second user device.

6. The method of claim 1, further comprising:
    determining a duration of the call,
    wherein the call log information, provided to the call log server device, includes information regarding the determined duration of the call.

7. The method of claim 6, further comprising:
    determining a first time value that corresponds to a time at which the second user device answered the call;
    determining, after determining that the second user device has answered the call and before generating the call log information, that the call has ended; and
    determining a second time value that corresponds to a time at which the call has ended,
    wherein determining the duration of the call is based on a difference between the first time value and the second time value.

8. The method of claim 1, wherein storing the unified call log includes overwriting a missed call indication, indicating that the call was missed by the first user device.

9. The method of claim 1, wherein the unified call log includes information regarding at least one of:
    a duration of the call at the first user device, to which the call was transferred,
    a duration of the call at the second user device, from which the call was transferred,
    a time at which the call was transferred from the second user device to the first user device,
    a time at which the call was answered by the first user device, to which the call was transferred, or
    an indication that the call was transferred from the first user device to the second user device.

10. A user device, comprising:
    a non-transitory memory device storing a set of processor-executable instructions; and
    a processor configured to execute the processor-executable instructions, wherein executing the processor-executable instructions causes the processor to:
        identify a received a signal indicating an incoming call;
        determine that another user device has answered the call;
        receive the answered call via a call transfer from the other user device to the user device;
        answer the transferred call;
        generate call log information that indicates that the user device has answered the transferred call;
        output the generated call log information to a call log server device, the call log server device also receiving call log information from the other user device indicating that the call has been transferred from the other user device to the user device, the call log server device further generating a unified call log regarding the call answered by the other user device and the transfer of the call to the user device;
        receive the unified call log from the call log server device; and
        store, in the non-transitory memory device, the received unified call log.

11. The user device of claim 10, wherein the user device and the other user device are in a set of user devices associated with a call blast service,
    wherein the call blast service causes the set of user devices to contemporaneously receive the signal indicating the incoming call.

12. The user device of claim 10, wherein determining that the other user device has answered the call includes:
    receiving a signal indicating that a line, associated with the user device and the other user device, is in an active call state.

13. The user device of claim 12, wherein receiving the signal, indicating that the line is in the active call state, includes receiving information regarding the other user device,
    wherein the information regarding the second user device includes at least one of:
        a device identifier associated with the other user device,
        a nickname associated with the other user device, or
        information regarding a geographical location of the other user device.

14. The user device of claim 10, wherein executing the processor-executable instructions further causes the processor to:
    determine a duration of the call,
    wherein the call log information, provided to the call log server device, includes information regarding the determined duration of the call.

15. The user device of claim 14, wherein executing the processor-executable instructions further causes the processor to:
  determine a first time value that corresponds to a time at which the other user device answered the call;
  determine, after determining that the other user device has answered the call and before generating the call log information, that the call has ended; and
  determine a second time value that corresponds to a time at which the call has ended,
  wherein determining the duration of the call is based on a difference between the first time value and the second time value.

16. The user device of claim 10, wherein storing the unified call log information includes:
  overwriting an indication that the call was missed by the user device.

17. The user device of claim 10, wherein the unified call log includes information regarding at least one of:
  a duration of the call at the first user device, to which the call was transferred,
  a duration of the call at the second user device, from which the call was transferred,
  a time at which the call was transferred from the second user device to the first user device,
  a time at which the call was answered by the first user device, to which the call was transferred, or
  an indication that the call was transferred from the first user device to the second user device.

18. A system, comprising:
  a non-transitory memory device storing a set of processor-executable instructions; and
  a processor configured to execute the processor-executable instructions, wherein executing the processor-executable instructions causes the processor to:
    notify first and second user devices regarding an incoming call;
    receive first call log information, from the first user device, indicating that the first user device has answered the call;
    receive a notification indicating that the call has been transferred from the first user device to the second user device;
    receive second call log information, from the second user device, that includes information regarding the transferred call;
    generate a unified call log based on the received first call log information and second call log information, the unified call log including information indicating that the call was transferred from the first user device to the second user device; and
    output the unified call log to at least one of the first or second user devices.

19. The system of claim 18, wherein the unified call log includes information regarding a total duration of the call, including a duration of a portion of the call as answered by the first user device and a duration of a portion of the call as answered by the second user device.

20. The system of claim 18, wherein the unified call log includes information indicating that the call was transferred from the first user device to the second user device.

* * * * *